Feb. 6, 1923.
E. MOSELEY.
RAKE.
FILED JAN. 5, 1922.
1,444,001
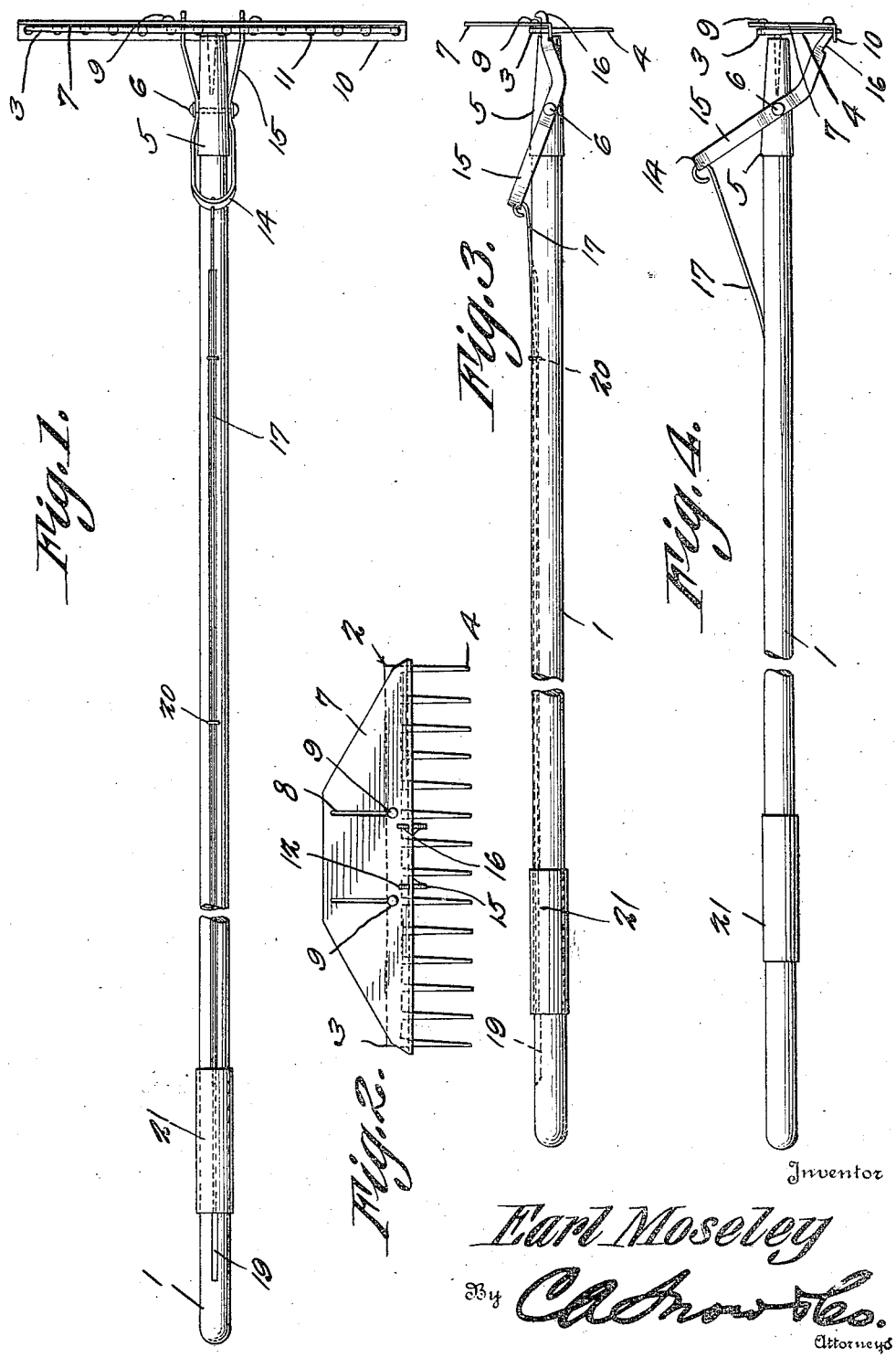
Inventor
Earl Moseley
By C. A. Snow & Co.
Attorneys Patented Feb. 6, 1923.

1,444,001

UNITED STATES PATENT OFFICE.

EARL MOSELEY, OF AURORA, ILLINOIS.

RAKE.

Application filed January 5, 1922. Serial No. 527,145.

*To all whom it may concern:*

Be it known that I, EARL MOSELEY, a citizen of the United States, residing at Aurora, in the county of Kane and State of Illinois, have invented a new and useful Rake, of which the following is a specification.

This invention aims to provide a simple but efficient device for cleaning the teeth of a rake from trash.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in top plan, a device constructed in accordance with the invention; Figure 2 is an end elevation; Figure 3 is a side elevation showing the slide raised; Figure 4 is a side elevation showing the slide lowered.

The numeral 1 denotes a handle, carrying a head, designated generally by the numeral 2 the head including a bar 3 carrying teeth 4, a socket 5 being secured to the bar 3. The handle 1 is received in the socket 5 and is held therein by a securing element 6.

A slide 7, in the form of a plate, is disposed parallel to the teeth 4 of the rake and has transversely elongated slots 8 receiving headed studs 9 mounted in the bar 3, the slide having a rearwardly extended flange 10 provided with openings 11 receiving the teeth 4. Owing to the fact that the teeth 4 are received in the openings 11 of the flange 10, and owing to the provision of the headed studs 9, the slide or plate 7 is mounted for reciprocation on the head 2 of the rake in a direction parallel to the teeth 4, downward movement of the slide ceasing when the studs 9 arrive at the upper ends of the slots 8. Adjacent to its lower edge, the slide 7 is provided with openings 12.

The numeral 14 marks a U-shaped lever, including side arms 15 fulcrumed on the securing element 6. The securing element 6 exercises a two fold office. First, it serves to retain the socket 5 on the handle 1, and, secondly, it constitutes a fulcrum for the lever 14. Each arm of the lever 14 terminates in a reduced tip 16, the tips of the lever being received loosely in the openings 12 of the slide 7. The numeral 17 marks an operating member, in the form of a rod, the rod being provided at its forward end with an eye 18 received pivotally in the bend of the U-shaped lever 14. The operating member or rod 17 slides in a groove 19 formed in the handle 1, the operating member or rod being disposed beneath guides 20, which may be staples, the staples extending across the groove 19. The rear end of the operating member or rod 17 is connected to a tubular grip 21 mounted for reciprocation on the handle 1.

In practical operation, when longitudinal movement is imparted to the operating member 17, through the instrumentality of the grip 21, the lever 14 is tilted on its fulcrum 6, vertical reciprocating movement is imparted to the slide 7, the flange 10 of the slide serving to free the teeth 4 of the rake from trash. When the teeth of the rake are in use, the slide 7 is held in the elevated position shown in Figure 3.

What is claimed is:—

In a device of the class described, a head comprising a bar having teeth, and a socket secured to the bar; a handle having a longitudinal groove and provided with a guide extended across the groove, the handle being received in the socket; a securing element mounted in the socket and passing through the handle; a slide disposed parallel to the teeth and including a rearwardly extended flange having openings receiving the teeth, the slide having transversely spaced elongated slots; headed studs mounted in the bar and received in the slots of the slide; a U- shaped lever including side arms fulcrumed on the securing element, each arm of the lever terminating in a reduced tip, and the slide being provided adjacent to its lower edge with openings wherein the tips are received loosely; an operating rod slidable in the groove of the handle beneath the guide, and connected pivotally with the intermediate portion of the lever; and a tubular grip mounted for reciprocation on the handle, the rod being connected to the grip.

In testimony that I claim the foregoing as my own, I have hereto affixed my signature in the presence of two witnesses.

EARL MOSELEY.

Witnesses:
 G. W. LININGTON,
 J. P. LOWE.